United States Patent [19]

Broyan

[11] 4,039,002
[45] Aug. 2, 1977

[54] GAS COMPRESSOR VALVE

[76] Inventor: Fred K. Broyan, 885 York Road, Warminster, Pa. 18974

[21] Appl. No.: 691,018

[22] Filed: May 28, 1976

[51] Int. Cl.² .................... F16K 15/08; F16K 15/12
[52] U.S. Cl. ............................ 137/516.17; 137/852
[58] Field of Search ................. 137/512.15, 516.11, 137/516.15, 516.17, 516.21, 516.23, 852, 859, 516.19

[56] References Cited

U.S. PATENT DOCUMENTS

| | | | |
|---|---|---|---|
| 2,690,763 | 10/1954 | Seligman | 137/516.11 |
| 2,703,583 | 3/1955 | Seligman | 137/516.21 X |
| 3,360,006 | 12/1967 | Kehler | 137/516.21 X |
| 3,945,397 | 3/1976 | Riedel | 137/516.21 X |

Primary Examiner—Robert G. Nilson

Attorney, Agent, or Firm—Joseph W. Molasky

[57] ABSTRACT

The invention essentially comprises a compressor valve wherein the area of the tapered port in the inlet seat is larger than the area of the exhaust ports in the plate and guard. In addition, the exhaust ports are formed in the plate and guard around the respective inlet ports in the form of a staggered annulus. The larger open area in the seat enables the plate to be opened with lower pressure and the staggered annulus configuration produces substantially more open area through the valve for reduced plate lift and improved breathing.

There is also disclosed a second embodiment of the invention which utilizes tabs for aligning and guiding a movable and flexible disc between the seat and guard without the use of alignment pins and valve springs.

6 Claims, 5 Drawing Figures 4,039,002

GAS COMPRESSOR VALVE

BACKGROUND OF THE INVENTION

This invention relates in general to the field of compressor valves and in particular to the field of compressor valves of the suction and discharge type.

DESCRIPTION OF THE PRIOR ART

It is known in the prior art, as described in Seligman U.S. Pat. No. 2,690,763, for example, that the holes in a valve seat can be alternated with holes in the plate and guard in such manner that the former are arranged like the white squares on a chess board, and those of the plate and guard like the corresponding black squares. Alternatively, according to this patent the holes can be arranged in concentric circles so that the holes in the seat alternate with those in the plate and guard on the same circle.

The shortcoming of the Seligman valve is that his chess board or concentric hole patterns produce too much closed area or blockage and an inefficient open area. As a result, the fluid emitted from the seat port encounters blockage as it seeks the exhaust ports located in the plate and guard. This blockage causes turbulance and poor valve breathing and thus causes higher operating temperatures and increased wear on the valve components, particularly on the plate. For these reasons, the Seligman structure is deemed to provide poor valve performance.

SUMMARY OF THE INVENTION

This invention relates to a gas compressor valve which develops increased open area through the valve by means of a staggered cluster of exhaust and disc ports which are in the form of a regular hexagon. More open area and less closed area is produced through the valve by this configuration. Gas velocity is maintained through the valve with decreased turbulence by this increased open area, thereby maintaining normal operating temperature and preventing overheating. Other benefits accruing from this unique valve configuration are a low contact force between the seat and plate, low disc speed and rapid disc response, low disc lift, less disc weight, and less spring pre-load.

In another embodiment of the invention, a unique disc aligning and guiding tab mechanism is utilized which permits the elimination of all movable contact guiding points. In this arrangement the aligning tabs flex to allow the disc to lift. This mechanism is particularly useful when using non-lubricating gases.

DESCRIPTION OF THE PREFERRED EMBODIMENTS

Reference shall now be made to the Figures in greater detail.

Figure 1:
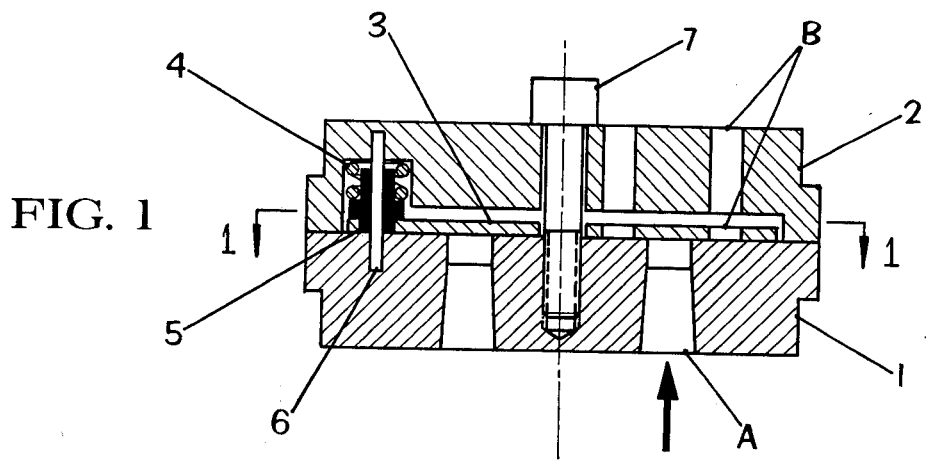
FIG. 1 shows a sectional view of a compressor discharge valve along the line II—II of FIG. 2.
Figure 2:
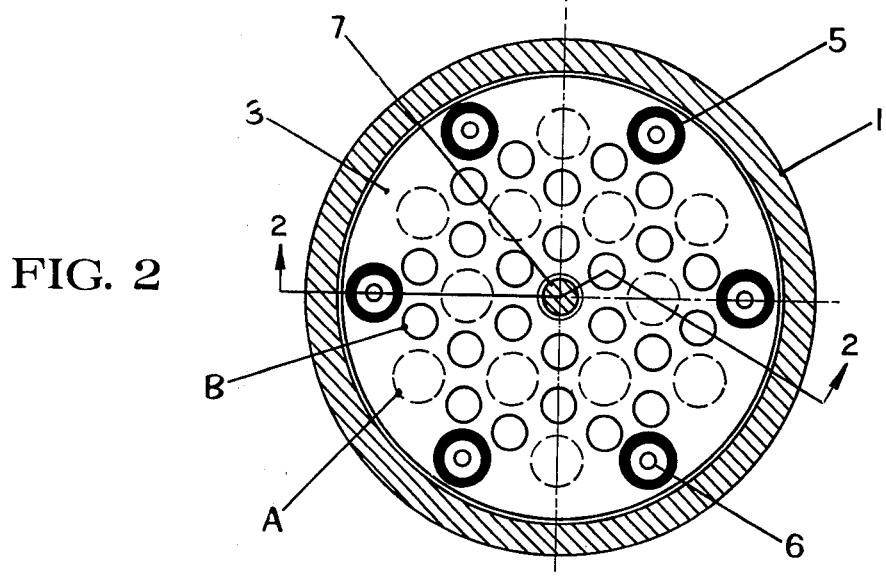
FIG. 2 depicts a section along the line I—I of FIG. 1.

FIG. 1 depicts a sectional view along the line II—II of FIG. 2 and illustrates the elements of the valve including seat 1, plate 3 and guard 2. The center bolt 7 is threaded into seat 1 and thereby bolts guard 2 to the seat. The plate 3 is located between the seat 1 and guard 2 and is shown held against the seat 1 in a closed position by means of spring 4, spring retainer 5 and spring guide 6. The plate 3 is provided with sufficient opening so that it may move up and down without interference from the bolt 7. The valve plate 3 is shown in the closed position because it is closed upon ports A. These ports prevent the gas (represented by the arrow) from escaping through the valve until the pressure is sufficiently high. The plate 3 moves between the valve seat 1 (closed position) and valve guard 2 (open position) via the valve guides 6, which are positioned through the spring retainer 5 and the spring 4. A tapered (inlet) port A is formed in seat 1 and exhaust ports B are formed in registry in guard 2 and plate 3.

As the gas becomes pressurized, it causes the plate 3 to lift against the spring pre-load away from the valve seat 1 and toward the guard 2. As the plate 3 moves in the direction of guard 2 the exhaust ports B, which are smaller than inlet port A, are brought into registry. Thus, along line II—II, two exhaust ports B are produced in plate 3 and and guard 2 for each port A in seat 1. Also it can be seen from FIGS. 2 and 3 (see inlet port A) that every 60 degrees will produce two exhaust ports B. This is a significant aspect of the invention and it will be discussed in greater detail hereinafter.

FIG. 2 shows the overall relationship of the tapered inlet ports A in seat 1 with respect to the staggered annulus of six exhaust ports B formed in the plate 3 and guard 2. These exhaust ports are symmetrically spaced in a hexagonal configuration and are radially equidistant from the center of each inlet port. Positioned circumferentially around the valve are the spring retainers 5 and the plate guides 6.

Figure 3:
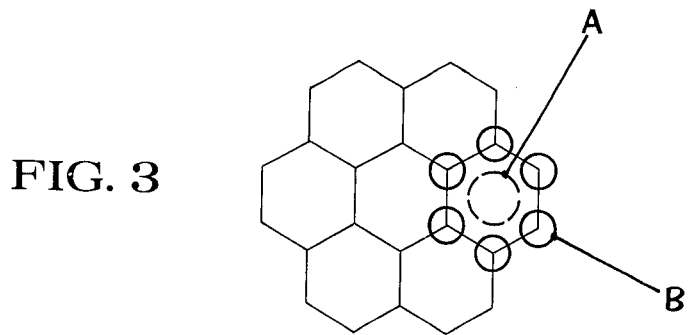
FIG. 3 depicts the pattern showing the staggered hexagonal annulus of ports with respect to the enlarged inlet seat port.

Referring now to FIG. 3; this Figure illustrates the staggered annulus around each port and shows the presence of two exhaust ports B for every 60° around each inlet port A. This staggered annulus configuration of exhaust ports B with respect to the inlet ports A, produces substantially increased open area through the valve. This is a significant feature in valve design since it decreases the velocity of gases through said valve, substantially improves its breathing performance and reduces turbulance.

In the prior art valves, if the open area is reduced and the velocity of the gas increases there is a corresponding increase in the operating temperature, and increase in speed of the back and forth movement of the plate 3 and an increase in the force of the disc contacting the seat. As those skilled in the art can appreciate, the above mentioned effects, caused by a reduced open area through the valve, cause compressor valve to break down after relatively short periods of time. Breakdowns in compressors not only cause inconvenience but increase operating and maintenance costs. This is not found to be the case in the instant invention which is designed with substantially increased open area.

Another benefit to the open area resulting from the hexagonal annulus around the instant inlet valve, is that a low plate lift is attained, with reasonable velocity, thereby resulting in quicker response time of the plate.

Furthermore, in view of the increased open area through valve plate 3, there is correspondingly less plate face area (see FIG. 2) and less disc weight. Therefore, a more responsive disc is provided. And because there is less face area in the plate there is also less pre-load on springs 4 (FIG. 1) which are arranged around the periphery of the valve (FIG. 2). This is essential to the long-life characteristics of the instant valve because low spring pre-load prevents undue wear on the seat. Also, by virtue of the placement of the springs on the extreme outside diameter of the disc, there is a distribution of the pre-load pressure over the entire disc area and, as a result, there are no void areas in the hole pattern. This aspect of the invention decreases any chance of turbulence and contributes to a smooth gas-flow pattern.

Another feature of this invention which contributes to the lack of turbulence and improved valve breathing, is the tapered inlet port A. This improvement is made possible due to the fact that inlet port A is functionally operable. Thus, inlet port A provides smooth passage of the gas as it is distributed to exhaust ports B.

Figure 4:
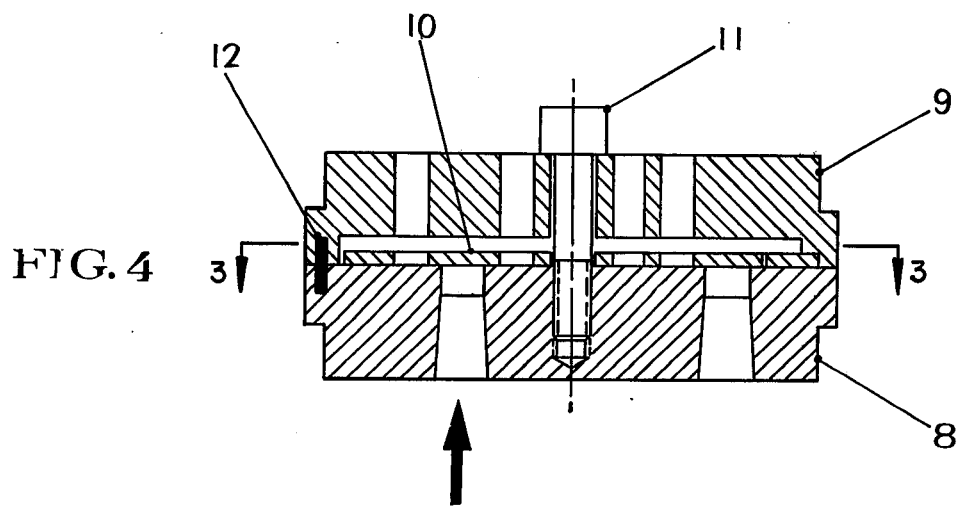
FIG. 4 depicts another embodiment of the invention and in particular depicts a sectional view along the line IV—IV of FIG. 5.
Figure 5:
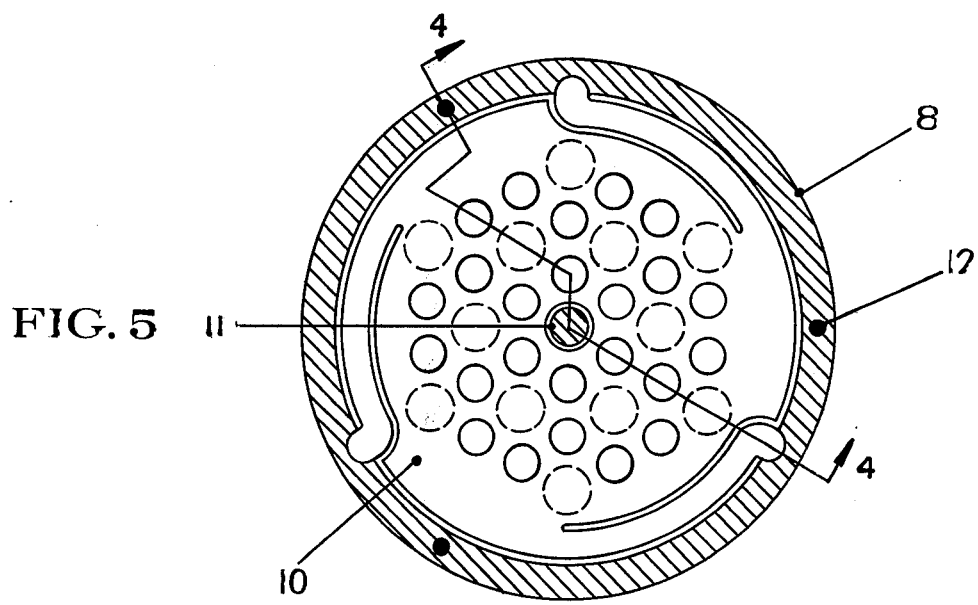
FIG. 5 shows a sectional view along the line III—III of FIG. 4.

FIGS. 4 and 5 illustrate another embodiment of this invention. FIG. 4 shows a sectional view along lines IV—IV of FIG. 5. FIG. 4 illustrates the staggered annulus arrangement wherein exhaust ports are positioned on opposite sides of a tapered inlet port every 60° in the manner previously described with respect to FIGS. 1 and 2. However, the embodiment of FIGS. 4 and 5 differs from that shown in FIGS. 1 and 2 in that no pre-load coil springs are utilized in conjunction with the plate 10. The seat 8 is shown in FIG. 4 joined to the guard 9 at the periphery of the valve via the metallic pins 12. The plate and guard are held in position around the periphery by three pins equally spaced (FIG. 5). The seat 8 and guard 9 are further joined to one another by threaded center bolt 11.

FIG. 5 is a section through line III—III of FIG. 4. This Figure illustrates the configuration of the staggered annulus of the ports in plate 10 and guard 9 with respect to the tapered port in seat 8 (see the dotted line). The advantages to this arrangement have been set forth in the description of the embodiment shown in FIGS. 1–3.

The plate 10 in this embodiment is oriented so that it will flex upwardly from its rest position on seat 8 until it is bowed upwardly toward guard 9 by the gas pressure designated by the arrow. The plate 10 is able to flex or bow out by reason of its thinness.

The plate 10 is positioned in the guard 9 such that the depth of the cut in the guard is the same as the plate thickness. The plate 10 is held in position by means of three tabs which are cut into the plate. The rounded ends of the three tabs are designed to press fit into the slots cut into the guard 9. The cut tabs actually provide the spring preload for the plate 10 and hence, the loading can be varied by modifying the length of the cut.

In operation, the pressure of the gas represented by the arrow (FIG. 4) enables the interior of the plate 10 (i.e., the area inside the tab cuts) to flex or bow out when the gas pressue (shown by the arrow in FIG. 4) is sufficiently high. When the gas pressure is decreased after passing through the valve, the flexible plate 10 collapses and returns to the quiescent state or the rest position on the seat 8 as shown in FIG. 4.

The advantages to this embodiment are identical to those resulting from the use of the staggered annulus configuration described in FIGS. 1–3. In addition, plate 10 with its flexible tabs, provides for spring loading without the use of coil springs, spring guides and spring retainer as employed in the first described embodiment of FIGS. 1–3. Therefore, FIGS. 4–5 illustrate a simpler and more economical embodiment, and one which can be readily modified for spring loading by the depth of the cut into plate 10.

This invention has been described with particularity and with reference to specific examples but it is to be understood that obvious modifications can be made to this invention without departing from the scope and spirit thereof. Insofar as any such modifications are within the purview of the artisan to perform, those changes are considered as being within the scope of this invention.

What is claimed is:

1. A valve assembly for a piston type compressor comprising:
    a. a valve seat and valve guard in spaced relationship to said valve seat;
    b. a valve plate located between the valve seat and valve guard wherein said plate quiescently rests on said seat, and moves away from said seat and toward said guard when a pressurized gas passes through said valve from said compressor;
    c. a plurality of tapered inlet ports in said valve seat positioned through the said seat;
    d. a plurality of exhaust ports in said plate and guard which are in registry, and which are of smaller diameter than said seat ports;
    e. said plate and guard ports being arranged around respective seat ports such that six exhaust ports are provided around each inlet port at 60° intervals.

2. The valve assembly of claim 1 which comprises:
    a. a valve seat and a valve guard in spaced relationship to said valve seat;
    b. a valve plate located between the valve seat and valve guard wherein, in the quiescent state, said plate rests on said seat and moves away from said seat and toward said guard when a pressurized gas passes through said valve from said compressor;
    c. a plurality of tapered inlet ports in said valve seat which are all of equal size;
    d. a plurality of exhaust ports in said plate and guard which are in registry and which are of smaller diameter than said seat ports;
    e. said plate and guard ports being arranged around respective seat ports in the form of a staggered annulus; such that when a pressurized gas flows through said seat port it causes the plate to move from said seat to said guard and said gas is rapidly expelled with minimum turbulence into the exhaust ports.

3. The valve assembly in accordance with claim 2 wherein said staggered annulus is in the shape of a hexagon.

4. The valve assembly in accordance with claim 2 wherein said inlet ports are tapered to provide a Venturi effect.

5. The valve assembly in accordance with claim 2 wherein pre-loaded springs are coupled to said plate around its periphery.

6. The valve assembly for a piston type compressor comprising:

a. a valve seat and a valve guard in spaced relationship to said valve seat;
b. a flexible valve plate located between the valve seat and valve guard;
c. said plate being held in position by elongated tabs formed into the plate and which fit into the guard,
d. said tabs having a length which corresponds to the desired spring pre-load on said plate;
e. a plurality of inlet ports spaced in the valve seat which are of equal size;
f. a plurality of exhaust ports which are in registry in said plate and guard and which are of smaller diameter than said seat ports;
g. said plate and guard ports being arranged around respective seat ports in the form of a staggered annulus, such that when a pressurized gas flows through said seat port it causes said plate to flex when the gas exceeds the spring pre-load of said tabs; said gas being rapidly expelled through said valve with minimum turbulence into the exhaust ports.

* * * * *